(12) United States Patent
Coyle

(10) Patent No.: US 7,299,700 B2
(45) Date of Patent: Nov. 27, 2007

(54) METHODS AND APPARATUS FOR SENSING PRESSURE

(75) Inventor: Sean James Coyle, Genoa, NV (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 11/243,256

(22) Filed: Oct. 4, 2005

(65) Prior Publication Data
US 2007/0074576 A1    Apr. 5, 2007

(51) Int. Cl.
*G01L 7/08* (2006.01)
(52) U.S. Cl. ...................................................... 73/715
(58) Field of Classification Search .................. 73/115, 73/112, 707, 715
See application file for complete search history.

(56) References Cited

U.S. PATENT DOCUMENTS

| | | | |
|---|---|---|---|
| 5,488,868 A * | 2/1996 | Ootake et al. ................. | 73/708 |
| 5,612,497 A * | 3/1997 | Walter et al. ................. | 73/756 |
| 6,053,048 A * | 4/2000 | Keller ........................ | 73/707 |
| 6,094,990 A | 8/2000 | Lykowski et al. | |
| 6,204,594 B1 | 3/2001 | Ingham | |
| 6,489,917 B2 | 12/2002 | Geisheimer et al. | |
| 6,853,934 B2 | 2/2005 | Nagamatsu | |
| 6,857,320 B2 | 2/2005 | Gleeson et al. | |
| 6,880,391 B2 | 4/2005 | Matsuyama et al. | |

* cited by examiner

*Primary Examiner*—Andre J. Allen
(74) *Attorney, Agent, or Firm*—Armstrong Teasdale LLP

(57) ABSTRACT

Methods and apparatus for sensing pressure in a hostile environment are described. In one example embodiment, a microwave radar based sensor is provided. The sensor is coupled to a signal conditioning unit. The signal conditioning unit includes at least one of a processor configured to determine a sensor value and a memory having pre-stored values therein, the pre-stored values representing possible sensor values. Each pre-stored value is assigned a respective pressure. The method includes operating the signal conditioning unit to sample a signal generated by the sensor, operating the signal conditioning unit to correlate a characteristic of the sampled signal to a pre-stored value having an assigned pressure, and operating the signal conditioning unit to generate a signal representative of the assigned pressure of the pre-stored value that is correlated to the sampled signal.

14 Claims, 2 Drawing Sheets

METHODS AND APPARATUS FOR SENSING PRESSURE

BACKGROUND OF THE INVENTION

This invention relates generally to engines and more particularly, to methods and apparatus for sensing pressure in combustion cylinders of reciprocating engines and combustion chambers of gas turbine engines.

Pressure within combustion cylinders and chambers of various types of engines impacts operation of such engines. For example, gas turbine engines typically include a compressor section, a combustor section, and at least one turbine section. The compressor compresses air, which is mixed with fuel and channeled to the combustor. The mixture is then ignited to generate hot combustion gases. The combustion gases are channeled to the turbine which extracts energy from the combustion gases for powering the compressor, as well as producing useful work to power a load such as an electrical generator or to propel an aircraft in flight.

Gas turbine engines operate in many different operating conditions, and combustor performance facilitates engine operation over a wide range of engine operating conditions. Controlling combustor performance facilitates improving overall gas turbine engine operations.

The environment within combustion cylinders and combustion chambers is harsh, which limits the types of pressure sensors that can be used. For example, temperature within the cylinders of internal combustion engines can reach over 1000° F. Known pressure sensors that utilize piezo-electric and piezo-resistive elements have limited life within such environment or require cooling, which increases the material and assembly costs for such engines.

Fiber optic based systems have been used in connection with sensing pressure in harsh environments. Producing reliable and robust sensors based on fiber optic materials, however, is challenging and has impacted widespread use of such sensors.

BRIEF DESCRIPTION OF THE INVENTION

In one aspect, a method for determining a pressure utilizing a microwave radar based sensor is provided. The sensor is coupled to a signal conditioning unit. The signal conditioning unit includes at least one of a processor configured to determine a sensor value and a memory having pre-stored values therein, wherein the pre-stored values representing possible sensor values. The method includes operating the signal conditioning unit to sample a signal generated by the sensor, operating the signal conditioning unit to correlate a characteristic of the sampled signal to a pre-stored value having an assigned pressure, and operating the signal conditioning unit to generate a signal representative of the assigned pressure of the pre-stored value that is correlated to the sampled signal.

In another aspect, a pressure sensor is provided. The sensor includes a sensor body, a diaphragm mounted within the sensor body, and a channel extending from an open end of the sensor body to the diaphragm to directly expose the diaphragm to a pressure. The sensor further includes a microwave radar sensing unit secured to the sensor body. The sensing unit includes a head positioned a distance from the diaphragm.

In yet another aspect, a gas turbine engine is provided. The engine includes a compressor discharging a flow of air, and a combustor assembly positioned downstream from the compressor. The combustor includes at least one combustion chamber. A turbine is positioned downstream from the combustor. A pressure sensor is mounted to the combustor. The sensor includes a sensor body, a diaphragm mounted within the sensor body, and a channel extending from an open end of the sensor body to the diaphragm to directly expose the diaphragm to a pressure in the combustion chamber. A microwave radar sensing unit is secured to the sensor body. The sensing unit includes a head positioned a distance from the diaphragm.

DETAILED DESCRIPTION OF THE INVENTION

The present invention is generally directed to a pressure sensor, and method of operating a pressure sensor, to generate a signal representative of pressure in harsh environments, such as in the combustion cylinder of a reciprocating engine and in a combustion chamber of a gas turbine engine. The present invention is described below in reference to its application in connection with and operation of a gas turbine engine. However, it will be obvious to those skilled in the art and guided by the teachings herein provided that the invention is likewise applicable in many different types of combustion devices including, without limitation, boilers, heaters and other turbine engines, and may be applied to systems consuming natural gas, fuel, coal, oil or any solid, liquid or gaseous fuel.

As used herein, references to "combustion" are to be understood to refer to a chemical process wherein oxygen, e.g., air, combines with the combustible elements of fuel, namely carbon, hydrogen and sulfur, at an elevated temperature sufficient to ignite the constituents.

Figure 1:
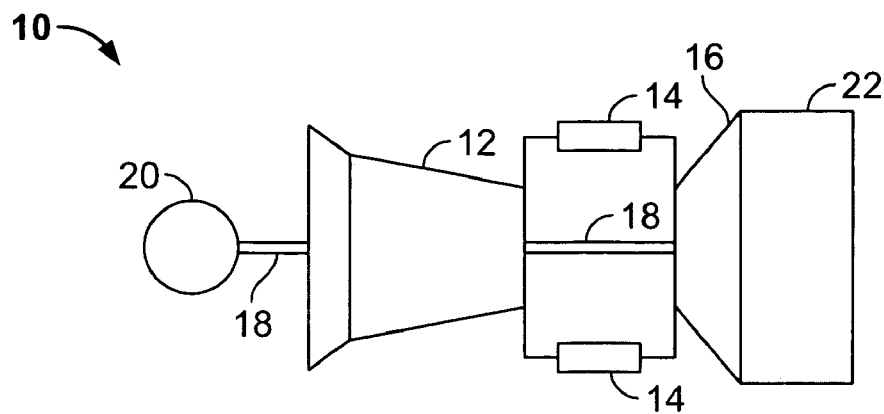
FIG. 1 is a schematic illustration of an exemplary gas turbine engine.

FIG. 1 is a schematic illustration of an exemplary gas turbine engine 10 including at least one compressor 12, a combustor assembly 14 and a turbine 16 connected serially. In the exemplary embodiment, compressor 12 and turbine 16 are coupled by a shaft 18, which also couples turbine 16 and a driven load 20. Engine 10 illustrated and described herein is exemplary only. Accordingly, engine 10 is not limited to the gas turbine engine shown in FIG. 1 and described herein, but rather, engine 10 may be any suitable turbine engine.

In operation, air flows into engine 10 through compressor 12 and is compressed. Compressed air is mixed with fuel to form an air/fuel mixture that is channeled to combustor assembly 14 where the air/fuel mixture is ignited. Combustion products or gases from combustor assembly 14 drive rotating turbine 16 about shaft 18 and exits gas turbine engine 10 through an exhaust nozzle 22.

Figure 2:
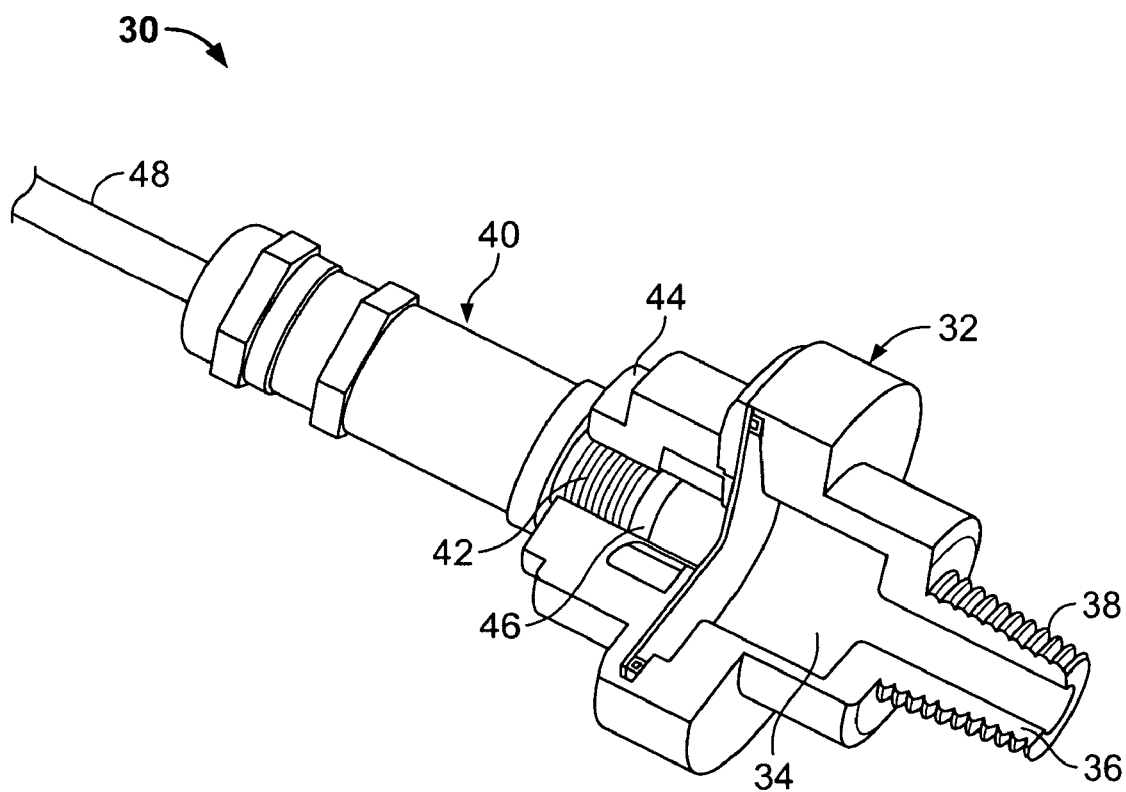
FIG. 2 is a partial cross section view of a pressure sensor in accordance with one embodiment of the present invention.

FIG. 2 is a partial cross section view of a pressure sensor 30 in accordance with one embodiment of the present invention. Sensor 30 includes a sensor body 32 having a diaphragm 34 mounted therein. In one embodiment, high temperature metal alloys, such as, but not limited to, Inconel® and/or Hastelloy®, are used in fabricating body 32 and/or diaphragm 34. Diaphragm 34 is exposed to pressure environment via a channel 36 within sensor body 32. A threaded portion 38 of body 32 is provided to secure sensor 30 to, for example, a combustion chamber of a gas turbine engine. A microwave radar sensing unit 40 is secured to sensor body 32. Microwave radar sensing units are well known and are commercially available, for example, from Radatec, Incorporated of Atlanta Ga.

In the embodiment illustrated in FIG. 2, sensing unit 40 includes external threads 42 that mate with internal threads 44 of sensor body 32. Sensing unit 40 includes a head 46 positioned at a selected distance from diaphragm 34, and an interface cable 48 is coupled to radar sensor head 46 and, as described below, extends to a signal conditioning unit (not shown in FIG. 2).

Generally, sensor 30 is mounted to a gas turbine engine so that diaphragm 34 is directly exposed to the pressure within an engine combustion chamber. External threads 38, for example, mate with threads of an opening in the chamber. The relative location of sensor 30 will vary depending on the application and design.

Figure 3:
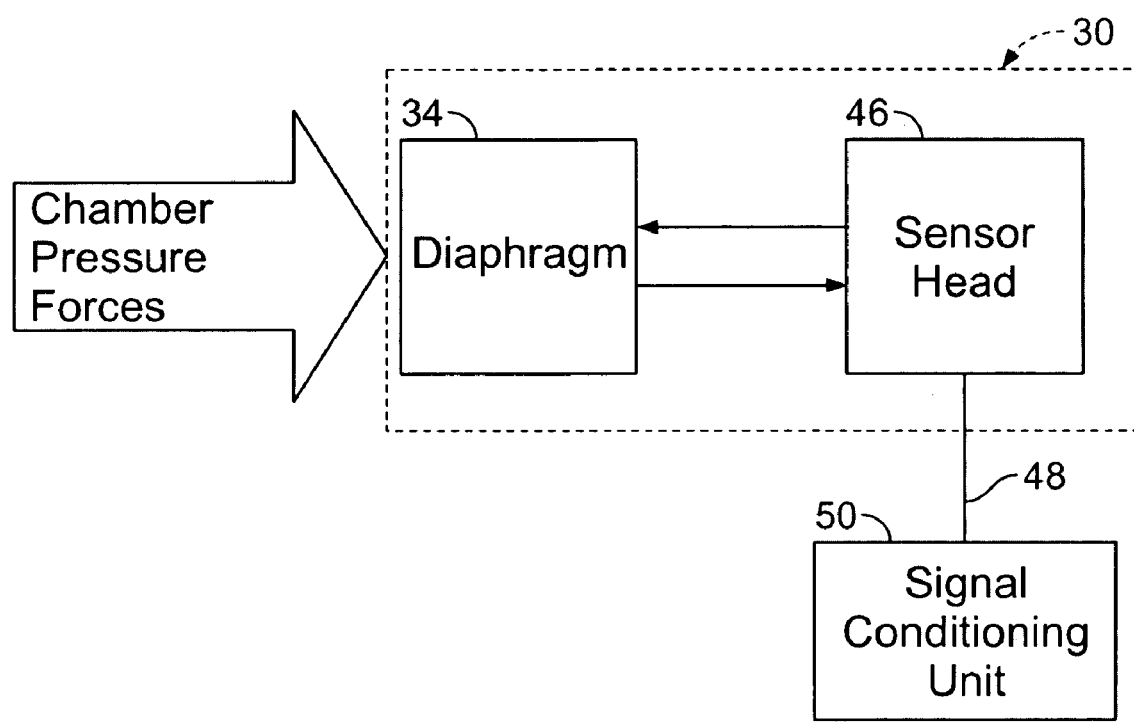
FIG. 3 is a schematic illustration of operation of the pressure sensor shown in FIG. 2.

FIG. 3 is a schematic illustration demonstrating operation of sensor 30. As shown in FIG. 3, sensor 30 is coupled to a signal conditioning unit 50. In the example embodiment, unit 50 is processor based and includes a microprocessor and a memory. Unit 50 is configured to sample the signal generated by sensor 30 and to store the signal in the unit memory. In an alternative embodiment, the microprocessor includes an algorithm used to determine an output based on input values, rather than, or in addition to, the use of a look-up table of values.

More particularly, and prior to normal operations, when the engine is not operating, sensing unit 50 is operated so that a zero pressure (or ambient pressure) reading is obtained from sensor 30. The magnitude of the signal from sensor 30 (which is representative of the distance between diaphragm and sensor head) at zero pressure is stored in signal conditioning unit 50. The engine is then operated at known combustion chamber pressures and sensor signals are obtained by signal conditioning unit 50 under such known pressures. Specifically, under known operating conditions, diaphragm 34 deflects in a linear manner when exposed to atmospheres of varying pressure. The degree of the linearity of diaphragm 34 contributes to the accuracy of sensor 30. The output of microwave radar sensor 30 is in proportion to the distance between sensor head 46 and a surface of diaphragm 34. In the exemplary embodiment, sensor 30 is calibrated using known pressures in the factory. Alternatively, and particularly if variation due to the environment cannot be replicated in the factory, sensor 30 may be calibrated on engines or combustors in the field, wherein at known operating pressures, the sensor unit signal is stored (e.g., the magnitude of the sensor signal) and correlated to the known pressure.

During engine operation, signal conditioning unit 50 is operated to sample the signal generated by sensor 30. Signal conditioning unit 50 is also operated to correlate a characteristic of the sampled signal to the pre-stored values having assigned pressures. Specifically, the magnitude (or some other characteristic) of the sensor signal is determined and matched to the determined magnitude to the pre-stored values. Signal conditioning unit 50 is further operated to generate a signal representative of the assigned pressure of the pre-stored value that is correlated to the sampled signal. This generated signal may be used, for example, to display the assigned pressure to an operator and/or to control engine operations.

In this manner, during operations of the gas turbine, both static and dynamic pressure values can be determined. The bandwidth of the pressure measurement is determined by the bandwidth of the microwave radar sensor and the diaphragm.

Similar, if not identical, sensor configurations and calibration can be performed in order to use sensor in connection with other types of engines. The sensor and sensor operation are not limited to the specific embodiments described herein.

While the invention has been described in terms of various specific embodiments, those skilled in the art will recognize that the invention can be practiced with modification within the spirit and scope of the claims.

What is claimed is:

1. A method for determining a pressure utilizing a microwave radar based sensor coupled to a signal conditioning unit, the signal conditioning unit including at least one of a processor configured to determine a sensor value and a memory having pre-stored values therein, the pre-stored values representing possible sensor values, each pre-stored value being assigned a respective pressure, said method comprising:

operating the signal conditioning unit to sample a signal generated by the sensor;

operating the signal conditioning unit to correlate a characteristic of the sampled signal to a pre-stored value having an assigned pressure;

operating the signal conditioning unit to generate a signal representative of the assigned pressure of the pre-stored value that is correlated to the sampled signal; and transmitting the signal representative of the assigned pressure to a control mechanism.

2. A method in accordance with claim 1 wherein the signal generated by the sensor is indicative of a deflection of a diaphragm exposed to the pressure being determined.

3. A method in accordance with claim 1 wherein the diaphragm deflects linearly based on exposed pressure.

4. A method in accordance with claim 1 wherein correlating a characteristic of the sampled signal to a pre-stored value comprises determining a magnitude of the sampled signal, and matching the determined magnitude to the pre-stored valued.

5. A method in accordance with claim 1 wherein the pressure is the pressure of a combustion chamber of a gas turbine engine.

6. A method in accordance with claim 1 wherein the pressure is the pressure of a combustion cylinder in a reciprocating engine.

7. A pressure sensor, comprising:

a sensor body;

a diaphragm mounted within said sensor body;

a channel extending from an open end of said sensor body to said diaphragm to directly expose said diaphragm to a pressure; and a microwave radar sensing unit secured to said sensor body, said sensing unit comprising a head positioned a distance from said diaphragm.

8. A pressure sensor in accordance with claim 7 wherein said diaphragm is configured to deflect based on a pressure of gas in said channel.

9. A pressure sensor in accordance with claim 8 wherein said diaphragm deflects linearly based on the gas pressure.

10. A pressure sensor in accordance with claim 7 wherein said body further comprises a threaded portion to secure said sensor to an engine.

11. A pressure sensor in accordance with claim 10 wherein the engine is a reciprocating engine.

12. A pressure sensor in accordance with claim 10 wherein the engine is a gas turbine engine.

13. A pressure sensor in accordance with claim 7 wherein said sensing unit comprises external threads that mate with internal threads of said sensor body.

14. A pressure sensor in accordance with claim 7 further comprising an interface cable coupled to said radar sensor head.

* * * * *